United States Patent
Thenthiruperai

(10) Patent No.: US 7,437,294 B1
(45) Date of Patent: Oct. 14, 2008

(54) METHODS FOR SELECTING ACOUSTIC MODEL FOR USE IN A VOICE COMMAND PLATFORM

(75) Inventor: Balaji S. Thenthiruperai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 804 days.

(21) Appl. No.: 10/718,967

(22) Filed: Nov. 21, 2003

(51) Int. Cl.
G10L 21/00 (2006.01)
(52) U.S. Cl. ............... 704/270.1; 704/270; 704/231
(58) Field of Classification Search ............... 704/251, 704/270.1, 275, 243, 246, 250, 270, 257, 704/231, 254, 8–9, 272, 274; 379/88.01
See application file for complete search history.

(56) References Cited

U.S. PATENT DOCUMENTS

| | | | | |
|---|---|---|---|---|
| 5,960,063 A | * | 9/1999 | Kuroiwa et al. ......... | 379/88.01 |
| 6,456,975 B1 | | 9/2002 | Chang ................ | 704/270.1 |
| 6,490,558 B1 | | 12/2002 | Kahn et al. ............ | 704/235 |
| 6,505,161 B1 | | 1/2003 | Brems ................ | 704/270 |
| 6,526,380 B1 | | 2/2003 | Thelen et al. ........... | 704/251 |
| 6,529,871 B1 | | 3/2003 | Kanevsky et al. ........ | 704/246 |
| 6,577,999 B1 | | 6/2003 | Lewis et al. ........... | 704/270 |
| 6,658,389 B1 | * | 12/2003 | Alpdemir ............. | 704/275 |
| 6,952,674 B2 | * | 10/2005 | Forand .............. | 704/243 |
| 7,171,361 B2 | * | 1/2007 | Thomas et al. .......... | 704/251 |
| 7,222,074 B2 | * | 5/2007 | Zhou ................ | 704/270 |

OTHER PUBLICATIONS

Pending U.S. patent application of Kevin Packingham et al., U.S. Appl. No. 09/964,140, filed Sep. 26, 2001.

Vergyri et al., "Minimum Risk Acoustic Clustering for Multilingual Acoustic Model Combination", Center for Language and Speech Processing, presented at International conference on Spoken Language Processing, Beijing (2000).

W3C Consortium, Voice Extensible Markup Language (VoiceXML) Specification Version 2.0, Section 6 Environment and Resources(Feb. 20, 2003).

Nuance Communications, Nuance Speech Recognition System Version 7.0 "Grammar Developer's Guide", (1996-2001).

Wikipedia, "Acoustic Model", http://en.wikipedia.org/wiki/Acoustic_Model, pp. 1-2 (Jun. 1, 2007).

W3C Working Draft, "Speech Recognition Grammar Specification for the W3C Speech Interface Framework", http://www.w3.org/TR/2001/WD-speech-grammar-20010103, pp. 1-5 (Jan. 3, 2001).

Technology Reports, "W3C Speech Recognition Grammar Specification", http://xml.coverpages.org/speechRecognitionGrammar.html, pp. 1-3 (Jan. 3, 2001).

* cited by examiner

Primary Examiner—Huyen X. Vo

(57) ABSTRACT

A voice command platform provides an application developer with the ability to select a particular acoustic model from a plurality of available acoustic models. In a representative embodiment, the application executing on the voice command platform is written in Voice XML, a tag-based language. The programmable selection of the speech recognition engine and the acoustic model is provided by means of a VXML root document having VXML code. The of the <metadata> element of the VXML specification is extended to encompass selection of a particular acoustic model. The root document includes the <metadata> element with the name of the acoustic model to use. Other methods for selection of acoustic model are also disclosed, including HTTP headers, interactive selection, and the use of area codes or local exchanges where the user using the voice application is calling from.

1 Claim, 1 Drawing Sheet

METHODS FOR SELECTING ACOUSTIC MODEL FOR USE IN A VOICE COMMAND PLATFORM

BACKGROUND

1. Field of the Invention

This invention relates generally to speech recognition systems, and more particularly to methods for selection of an acoustic model for use in a voice command platform.

2. Description of Related Art

Speech recognition is the process by which an acoustic signal received by a microphone is converted to a set of words or phonemes by a computer. These recognized words may then be used in a variety of computer software applications for purposes such as document preparation, data entry and command and control. Speech recognition is also used in voice command platforms, a computer system that provides a user with the ability to access and use software applications over a telephone network, e.g., a wireless network.

Speech recognition is generally a difficult problem due to the wide variety of pronunciations, individual accents and speech characteristics of individual speakers. Speech recognition systems use acoustic models that model speech for a defined set of the population. Acoustic models are stored representations of word pronunciations that a speech recognition application uses to help identify words spoken by a user.

U.S. Pat. No. 6,577,999 issued Jun. 10, 2003, is directed to a method of automatically managing a plurality of acoustic models in a speech recognition application. Other prior art of interest includes U.S. Pat. No. 6,526,380, issued Feb. 25, 2003, which is directed to a speech recognition system having parallel large vocabulary recognition engines.

As taught in the '999 patent, there are several ways that acoustic models can be inserted into the vocabulary of a speech recognition application. For example, developers of speech recognition systems commonly provide an initial set of acoustic models or base forms for a basic vocabulary set and possibly for auxiliary vocabularies. In some cases, multiple acoustic models are provided for words with more than one pronunciation.

Since each particular user will tend to have their own style of speaking, it is important that the speech recognition system have the capability to recognize a particular user's pronunciation of certain spoken words. By permitting the user to update the acoustic models used for word recognition, it is possible to improve the overall accuracy of the speech recognition process for that user and thereby permit greater efficiencies.

Conventional speech recognition products that allow additional acoustic models for alternative pronunciations of words typically require the system administrator to decide when such acoustic models are to be added to those already existing. Significantly, however, this tends to be an extremely difficult decision for system administrators to make since system administrators often do not understand the basis upon which such a decision is to be made. Moreover, the task of managing multiple sets of acoustic models to account for variations in pronunciation can be a problem in a speech recognition application. For example, it is not desirable to maintain and store in memory large numbers of alternative acoustic models that do not truly reflect a user's word pronunciations. Also, acoustic models that are inappropriate for a particular user's pronunciations can cause repeated undesirable errors in otherwise unrelated words in the speech recognition process.

The speech recognition engine in a voice command platforms typically uses "grammars" and phoneme dictionaries, in addition to an acoustic model. The term "grammars" refers to a set of words or utterances that a voice command application will specify at a given state in the application, for example in response to a prompt. The speech recognition engine will typically include or have access to a dictionary database of "phonemes," which are small units of speech that distinguish one utterance from another.

Voice command platforms typically hosts a variety of voice applications, including voice activated dialing, call center applications and others. It is important that the applications are tuned for grammars, pronunciation dictionaries and acoustic models in order to optimize the user experience. In a voice command platform, multiple acoustic models may be made available. These acoustic models may be tuned for different segments of the population that have different speech inflection (Latino, Southern, etc.), or the acoustic models may be particularly tuned for types of voice responses that are expected for a particular application, e.g., numbers, names, sports or sports teams, cities, etc.

Currently, in voice command applications, speech recognition engine vendors allow multiple acoustic models to exist within the same speech recognition engine. However, they only allow their engine and the voice browser to control which applications get to choose between the acoustic models. They do not allow the application developer itself to specify particular acoustic models for their particular application.

Co-pending patent application Ser. No. 09/964,140 filed Sep. 26, 2001, assigned to the same assignee as this patent application, describes a voice command system in which the platform includes enhanced system logic that enables an application to specify various voice processing mechanisms the platform should use during execution of the application. In particular, the application can specify which of multiple text to speech engines, voice prompt stores, and/or secondary phoneme dictionaries to use. The content of the application Ser. No. 09/964,140 is incorporated by reference herein. Application Ser. No. 09/964,140 is not admitted as prior art, in view of 35 U.S.C. § 103(c).

SUMMARY OF THE INVENTION

A voice command platform provides an application developer with the ability to select a particular acoustic model from a plurality of available acoustic models. In a representative embodiment, the application executing on the voice command platform is written in Voice XML, a tag-based language. The programmable selection of the speech recognition engine and the acoustic model is provided by means of an extension of the <metadata> element of the VXML specification to encompass selection of an acoustic model. For example, the root VXML application document includes <metadata> commands for specifying a particular acoustic model to use with the application. Thus, the application developer is able to decide the acoustic model and speech recognition to use for its particular application. The ability of the application developer to specify by name the acoustic model to use in the <metadata> command is of course based on the assumption that the application developer knows in advance the names of the available models. This information can be provided to the application developers by numerous possible methods, such as by published voice command platform specifications, by so-called "style guides" that are made available to application developers, which contain as list of features for the platform for the best user experience, as part of application development programs, course materials, published manuals, etc.

Other techniques for specifying the acoustic model are also possible. As another example, a reserved option portion or field in an HTTP header could be reserved for specifying an acoustic model. The voice browser would parse the HTTP header and invoke the acoustic model as specified in the header.

A change in the acoustic model can be made interactively during the course of execution of the application, in addition to being specified initially. Also, the acoustic model could be selected or determined based on the area code (NPA code) or the three digit code for the local exchange number where the user is calling from (NXX code), where there is sufficient knowledge about the pronunciation characteristics of callers from the area code of local exchange to make a selection of an acoustic model.

DETAILED DESCRIPTION OF AN EXEMPLARY EMBODIMENT

Figure 1:
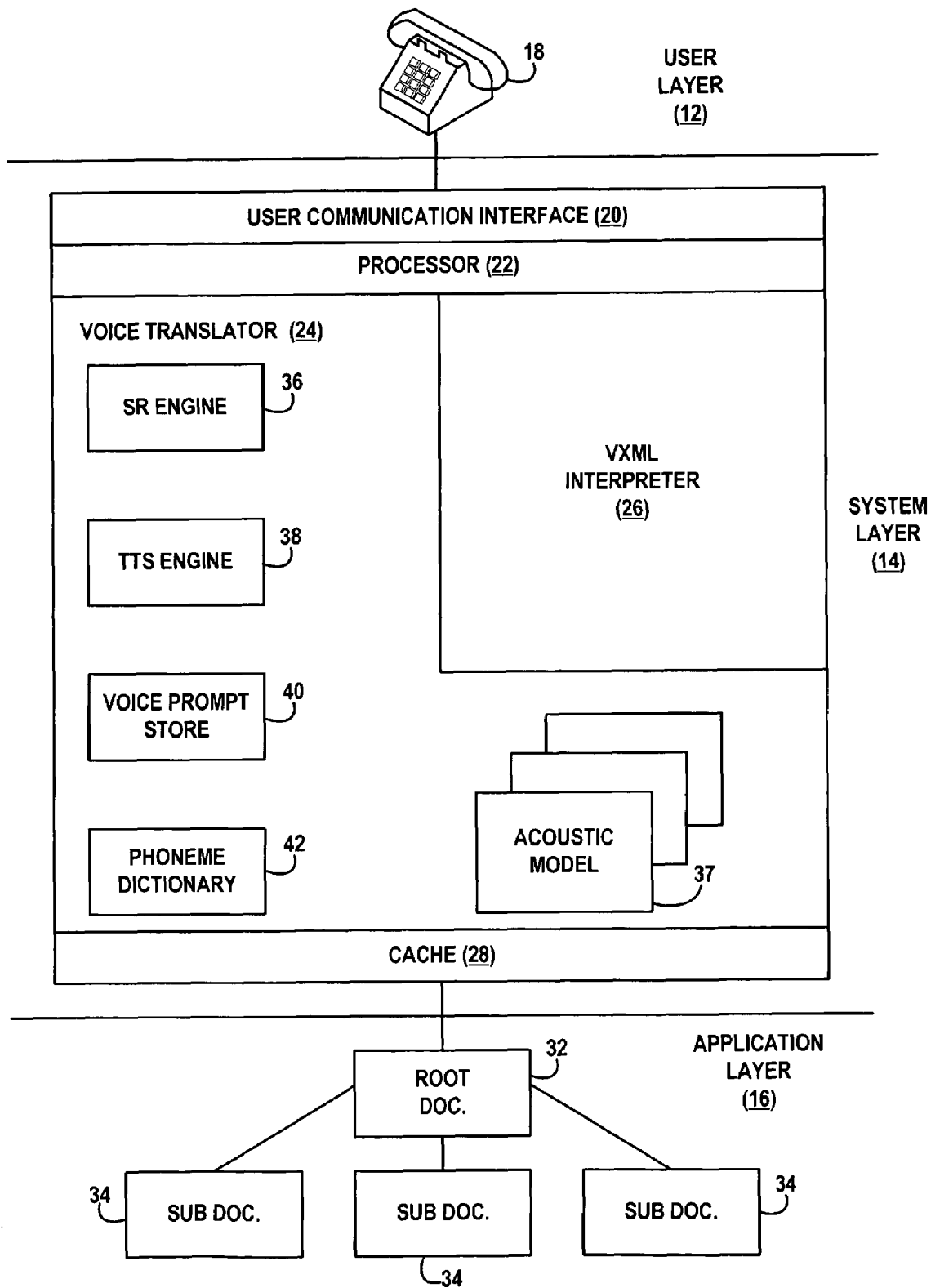
FIG. 1 is a block diagram of a network architecture in which exemplary embodiments of the present invention can be employed.

In accordance with a preferred embodiment, a voice command platform provides an application developer with the ability to select a particular acoustic model from a plurality of available acoustic models to use with an application.

In a preferred embodiment, this ability to select a particular acoustic model or speech recognition engine is provided by means of a programming command. In a preferred embodiment, the command is an extension of the <metadata> element of the VXML specification. The VXML application document can include <metadata> commands specifying an acoustic model to use with the application. Thus, the application developer is able to programmably set the acoustic model to use for its particular application. The application developer is provided with the names of the available models using any appropriate means, such as by published specifications, style guides, application development materials, etc. Other methods for selection of a particular acoustic model besides <metadata> commands are set forth below.

A general description of a voice command platform suitable for use with this invention will be set forth initially for purposes of describing a representative environment in which the invention can practiced. Later, several examples will be given showing the use of the <metadata> feature to specify an acoustic model, and other methods for specifying an acoustic model.

Representative Voice Command Platform

An exemplary voice command platform is a computer system including hardware (a processor and memory device) and software that provides an interface between speech communication with a user and computer-executed voice command applications (or, more generally, "logic"). A person can call an exemplary voice command platform from any telephone or similar device and, by speaking commands, can browse through navigation points (e.g., applications and/or menus items within the applications) to access and communicate information. The voice command platform can thus receive spoken commands from the user and use the commands to guide its execution of voice command applications, and the voice command platform can "speak" to a user as dictated by logic in voice command applications.

For instance, a person may call a voice command platform, and the platform may apply a voice command application that causes the platform to speak to the user, "Hello. Would you like to hear a weather forecast, sports scores, or stock quotes?" In response, the person may state to the platform, "weather forecast." Given this response, the application may cause the platform to load and execute a subsidiary weather forecasting application. The weather forecasting application may direct the platform to speak another speech prompt to the person, such as "Would you like to hear today's weather or an extended forecast?" The person may then respond, and the weather forecasting application may direct the voice command platform to execute additional logic or to load and execute another application based on the person's response.

A robust voice command platform may therefore be able to (i) receive and recognize speech spoken by a user and (ii) provide speech to a user. The platform can achieve these functions in various ways.

On the incoming side, for instance, the platform may include an analog-to-digital (A-D) converter for converting an analog speech signal from a user into a digitized incoming speech signal. (Alternatively, the user's speech signal might already be digitized, as in a voice-over-IP communication system, for instance, in which case A-D conversion would be unnecessary). The platform may then include a speech recognition (SR) engine, which functions to analyze the digitized incoming speech signal and to identify words in the speech. The SR engine will typically be a software module executable by a processor.

As noted above, a voice command application will usually specify which words or "grammars" a user can speak in response to a prompt, for instance. Therefore, the SR engine will seek to identify one of the possible spoken responses.

In order to identify words in the incoming speech, the SR engine will typically include or have access to a dictionary database of "phonemes," which are small units of speech that distinguish one utterance from another. The SR engine will then analyze the waveform represented by the incoming digitized speech signal and, based on the dictionary database, will determine whether the waveform represents particular words.

For instance, if a voice command application allows for a user to respond to a prompt with the grammars "sales," "service" or "operator", the SR engine may identify the sequence of one or more phonemes that makes up each of these grammars respectively. The SR engine may then analyze the waveform of the incoming digitized speech signal in search of a waveform that represents one of those sequences of phonemes. (That is, the SR engine may compare a phoneme representation of the spoken utterance to a phoneme representation of each allowed grammar.) Once the SR engine finds a match (or a best match), the voice command platform may continue processing the application in view of the user's spoken response.

Additionally, the SR engine or an ancillary module in the voice command platform may function to detect DTMF tones dialed by a user and to convert those DTMF tones into representative data for use in the execution of a voice command application. Thus, for instance, a voice command application might define a particular DTMF grammar as an acceptable response by a user. Upon detection of that DTMF grammar, the platform may then apply associated logic in the application.

On the outgoing side, the voice command platform may include a text-to-speech (TTS) engine for converting text into outgoing digitized speech signals. And the platform may include a digital-to-analog (D-A) converter for converting the outgoing digitized speech signals into audible voice that can be communicated to a user. (Alternatively, the platform might output the digitized speech signal itself, such as in a voice-over-IP communication system).

A voice command application may thus specify text that represents voice prompts to be spoken to a user. When the voice command platform encounters an instruction to speak such text, the platform may provide the text to the TTS engine. The TTS engine may then convert the text to an outgoing digitized speech signal, and the platform may convert the signal to analog speech and send it to the user. In converting from text to speech, the TTS engine may also make use of the dictionary database of phonemes, so that it can piece together the words (and pieces of words) that make up the designated speech.

Also on the outgoing side, a voice command platform may include a set of stored voice prompts, in the form of digitized audio files (e.g., *.wav files) for instance. These stored voice prompts would often be common prompts, such as "Hello", "Ready", "Please select from the following options", or the like. Each stored voice prompt might have an associated label (e.g., a filename under which the prompt is stored). By reference to the label, a voice command application might then specify that the voice command platform should play the prompt to a user. In response, the voice command platform may retrieve the audio file, convert it to an analog waveform, and send the analog waveform to the user.

A voice command application can reside permanently on the voice command platform (e.g., as a logical component of the platform), or it can be loaded dynamically into the platform. For instance, the platform can include or be coupled with a network or storage medium that maintains various voice command applications. When a user calls the platform, the platform can thus load an application from the storage medium and execute the application. Further, in response to logic in the application (such as logic keyed to a user's response to a menu of options), the platform can load and execute another application. In this way, a user can navigate through a series of applications and menus in the various applications, during a given session with the platform.

A voice command application can be written or rendered in any of a variety of computer languages. One such language is VoiceXML (or simply "VXML"), which is a tag-based language similar the HTML language that underlies most Internet web pages. (Other analogous languages, such as SpeechML and VoxML for instance, are available as well.) By coding a voice command application in VXML, the application can thus be made to readily access and provide web content, just as an HTML-based application can do. Further, when executed by the voice command platform, the VXML application can effectively communicate with a user through speech. Persons skilled in this art are familiar with the VXML language and the specifications which define it.

An application developer can write a voice command application in VXML. Alternatively, an application developer can write an application in another language (such as Java, C, C++, etc.), and the content of that application can be rendered in VXML. (For instance, when the platform loads an application, the platform or some intermediate entity could transcode the application from its native code to VXML.)

In order for a voice command platform to execute a VXML application or other tag-based application, the platform should include a VXML browser or "interpreter." The VXML interpreter functions to interpret tags set forth in the application and to cause a processor to execute associated logic set forth in the application.

A VXML application can be made up of a number of VXML documents and other objects, just like an HTML web site can made up of a number of HTML pages and objects. A VXML application that is made up of more than one document should include a root document, somewhat analogous to an HTML home page. According to VXML, the root document defines variables that are available to all subsidiary documents in the application. Whenever a user interacts with documents of a VXML application, the root document of the application is also loaded. Therefore, variables defined in the root document should be available during execution of any of the documents of the application. The root document is one possible place where an application developer can specify speech recognition engines and/or acoustic models, in accordance with the present invention.

Customarily, each VXML document will include a <vxml> tag to indicate that it is a VXML document. It may then include a number of <form> sections that can be interactive (e.g., prompting a user for input) or informational (e.g., simply conveying information to a user.) Within a given form, it may further include other executable logic.

A VXML document can also define grammars as described above. In particular, VXML grammars are words or terms that the VXML application will accept as input during execution of the application. The VXML document may expressly list the allowed grammars, or it may reference a file or other object that defines the allowed grammars (just as an HTML document can reference another file). When a VXML application is executed on a voice command platform, the platform may provide the SR engine with an indication of the grammars that the VXML application will accept. Once the SR engine detects that a user has spoken one of the grammars, the platform may then apply that grammar as input to the VXML application, typically proceeding to execute a set of logic (e.g., a link to another document) in response.

For example, a VXML document can define, as grammars, a number of possible options, as well as a number of possible words or phrases that a user can speak to select those options. For instance, a document might define as options of clothing the items "hat", "shirt", "pants" and "shoes". In turn, the document might define the following as acceptable grammars for the "hat" option: "hat", "visor", "chapeaux" and "beret".

A VXML document or other voice command application can define a set of grammars in various ways. For instance, the grammar set could be defined using a well known coded language such as GSL (by Nuance of Menlo Park, Calif.), SRGS (by W3C, as described on the World Wide Web at www.w3.org/TR/speech-grammar/) or BNF (by SpeechWorks), which the voice command platform can translate into, or understand to represent, a particular phoneme or combination of phonemes. Thus, when faced with an utterance from a user, the platform can compare a phoneme representation of the utterance with a phoneme representation of each allowed grammar, in order to find a best match.

In a typical arrangement, grammars defined in the root document of a VXML application are, by default, available for use in all of the subsidiary documents of the application. Thus, when a voice command platform is executing a VXML application, if a user speaks a grammar that is defined in the root document of the application, the voice command platform would responsively execute the logic that accompanies that grammar in the root document of the application.

In a voice command platform, each navigation point may have a respective identifier or label. For example, each voice command application can have a respective label, such as a network address where the application is maintained. And as another example, a voice command application can define a number of successive menus through which a user can browse, and each menu might have a respective label by which it can be referenced. A voice command platform can use these labels to move from application to application or from menu item to menu item, just as hyperlinks operate to cause a browser to move from one web page (or component of one web page) to another.

In VXML, for instance, each VXML document will have a respective Universal Resource Identifier (URI), which is akin to (or a generalization of) a Universal Resource Locator (URL) used to identify the network location of an HTML page. A given VXML document may thus define logic that instructs the voice command platform to load and execute another VXML document or some other object from a designated URI. For instance, a VXML document may indicate that, if a user speaks a particular grammar, the platform should load and execute a particular VXML document from a designated URI, but that, if the user speaks another grammar, the platform should load and execute another VXML document from another designated URI.

Referring now to the drawings, FIG. 1 is a functional block diagram illustrating the layers of a communication system including a voice command platform in which the exemplary embodiment can be employed, continuing with the networked voice command platform example.

As shown in FIG. 1, the system may be considered to include three layers, (i) a user layer 12, (ii) a voice command platform or system layer 14, and (iii) an application layer 16. The user layer 12 provides a mechanism 18, such as a telephone, for a person to communicate by voice with the platform. The voice command platform is shown as a system layer 14, and includes a user communication interface 20, a processor 22 (i.e., one or more processors), a voice-processing module 24, a VXML interpreter module 26, and a cache 28. The application layer 16 then defines an application 30, which may be made up of a root document 32 and subsidiary documents 34 that can be loaded into cache 28 and executed by processor 22, i.e., by the voice command platform.

User communication interface 20 may take various forms. For example, the user communication interface can provide a circuit or packet interface with a telecommunications network (such as the PTSN or the Internet, either of which may provide connectivity to one or more users via at least one wireless communications link—such as a cellular communication system for instance). The communication interface may, in turn, include an A-D and D-A converter (not shown) as described above, for converting between analog signals on the user side and digital signals on the platform side. Processor 22 then sends and receives communications via user communication interface 20.

Voice-processing module 24 and VXML interpreter module 26 preferably define program instructions that can be executed by processor 22 and data that can be referenced by the processor, to carry out voice processing functions. All of this program logic can be stored in suitable data storage, such as ROM or a disk drive for example.

For instance, voice-processing module 24 preferably includes a plurality of available speech recognition engines 36, a plurality of available acoustic models 37, and a TTS engine 38, as well as a voice prompt store 40. Further, voice-processing module 24 may include a phoneme dictionary 42 that the processor can reference to facilitate operation of the selected SR engine and the TTS engine as noted above. VXML interpreter module 26, in turn, may facilitate execution of application 30, such as by interpreting tags in the application.

Cache 28 functions to temporarily hold application 30 (or one or more documents of the application) when processor 22 is executing the application. Thus, in operation, processor 22 may retrieve application 30 from a designated URI on the Internet (or elsewhere) and may load the application into cache 28. The processor may then execute the application, using VXML interpreter 26 to interpret tags, using TTS engine 38 and voice prompt store 40 to send speech to a user, and using a SR engine 36 and an acoustic model 37 to recognize speech spoken by a user.

It should be understood that that this and other arrangements described herein are set forth for purposes of example only. As such, those skilled in the art will appreciate that other arrangements and other elements (e.g., machines, interfaces, functions, orders and groupings of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

For example, although the voice command system is shown to include a VXML interpreter, the system may include another type of voice browser. Alternatively, the system might not be browser-based at all. In that event, some of the functions described herein could be applied by analogy in another manner, such as through more conventional interactive voice response (IVR) processing.

As another example, although the application layer 16 is shown separately from the system layer 14, the application layer could be integrated in whole or in part with the system layer. For instance, a voice command application could be defined by logic resident permanently on the voice command platform and/or by logic downloaded to the voice command platform. Other variations are possible as well.

Programmable Selection of Acoustic Model

The voice command platform of FIG. 1 provides an application developer with the ability to select a particular acoustic model from a plurality of available acoustic models. In a representative embodiment, the application executing on the voice command platform is written in Voice XML. The programmable selection of the speech recognition engine and the acoustic model is provided by means of an extension of the <metadata> element of the VXML specification to encompass selection of an acoustic model. For example, the root VXML application document includes a <metadata> command specifying a particular acoustic model to use with the application. Thus, the application developer is able to decide the acoustic model and speech recognition to use for its particular application. The ability of the application developer to specify by name the acoustic model to use in the <metadata> command is of course based on the assumption that the application developer knows in advance the names of the available models. This information can be provided to the application developers by numerous possible methods, such as by published voice command platform specifications, by so-called "style guides", as part of application development programs, course materials, published manuals, etc.

Other techniques for specifying the acoustic model are also possible. As another example, a reserved option portion or field in an HTTP header could be reserved for specifying an acoustic model. The voice browser would parse the HTTP header and invoke the acoustic model as specified in the header.

Also, a change in the acoustic model can be made interactively during the course of execution of the application, in addition to being specified initially. Also, the acoustic model could be selected or determined based on the area code (NPA code) or the three-digit code for the local exchange number where the user is calling from (NXX code), where there is sufficient knowledge about the pronunciation characteristics of callers from the area code or local exchange to make a selection of an acoustic model.

EXAMPLE 1

A VXML root document 32 includes programmable commands to specify a speech recognition engine and a particular acoustic model from a plurality of available acoustic models for use with the application. The commands are in the form of a block of metadata code that is compliant with the VXML specification version 2.0 section 6.2.1, in Resource Description Framework (RDF) syntax and in compliance with the Dublin Core Metadata Initiative Version 1.0 RDF schema. The VXML root document includes the following code:

. . . (other metadata information regarding document)
<rdf:li>Nuance</ref:li>
<rdf:li>Fibonacci</ref:li>
. . . (other metadata information regarding document)

Here, "Nuance" is the identification of the company that provides a particular speech recognition engine to use in the application. "Fibonacci" is the name of a particular acoustic model to use. Different speech recognition engines that could be specified include those supported by the voice command platform (including engines from IBM, ScanSoft, etc). Similarly, the acoustic models that could be selected include any available acoustic models supported by the platform.

In the event the application does not specify a speech recognition engine or an acoustic model, a default speech recognition engine and a default acoustic model are used.

EXAMPLE 2

A speech recognition engine and acoustic model are selected initially as in Example 1.

If, during the execution of the application, the speech recognition engine 36 is having difficulty processing voice responses from the user, the application can prompt the user to interactively change the acoustic model. This may occur by prompting the user as follows:

System: The system is having difficulty processing your voice responses. Please identify where you are from: say one for the Northeast, say two for the South, say three for Britain [and other options].

User: Two

The application then instructs the voice command platform to select the "Southern" acoustic model.

EXAMPLE 3

No particular speech recognition engine or acoustic model is specified by the application in the VXML document. A default speech recognition engine 36 and acoustic model 37 are selected by the voice command platform 14.

During the execution of the application, the speech recognition engine has difficulty processing voice responses from the user. The speech recognition engine is changed by the application by execution of a metadata element specifying a new speech recognition engine, similar to that shown in Example 1.

The application may also specify a new acoustic model interactively, similar to the procedure set forth in Example 2.

EXAMPLE 4

The developer of the voice command application has determined that users from particular area codes or local exchanges within a particular area code have a predominant speaking accent, e.g., Southern. When a caller calls into the voice command platform and seeks to interact with the application, the area code and/or local exchange number (NXX/NPA code) where the user is dialing from is stored and provided to the voice command application. The voice command application uses this information to select a particular acoustic model to use, e.g., by reference to a simple look-up table that correlates area codes or NXX/NPA codes to particular acoustic models. This example will typically be invoked only where the voice application developer has a high or even complete understanding of the speaking characteristics of the population in the area and there is a high degree of homogeneity in the population. As before, after the initial acoustic model is selected, it can be interactively changed as described in Example 2 if the caller does not share the speaking characteristics of the majority of persons in the calling area.

While presently preferred embodiments have been described with particularity, the present description is offered by way of illustration and not limitation. The scope of the invention is to be determined by reference to the appended claims.

The invention claimed is:

1. A method of selecting an acoustic model for a voice command application executing on a voice command platform, comprising the steps of:
   providing a plurality of acoustic models;
   providing said voice command application with a Voice Extensible Markup Language (VXML) root document having metadata commands for specifying a particular acoustic model from said plurality of acoustic models; and
   selecting said specified particular acoustic model for use by said voice command application.

* * * * *